March 17, 1964 W. S. BUTLER ETAL 3,125,209
STACKER CONVEYOR AND METHOD OF CONVEYING
Filed Aug. 11, 1961 4 Sheets-Sheet 1

INVENTORS
William S. Butler
Paul J. Fontaine
Roy F. LoPresti

BY Parker & Carter
ATTORNEYS

INVENTORS
William S. Butler
Paul J. Fontaine
Roy F. LoPresti
BY Parker & Carter
ATTORNEYS March 17, 1964  W. S. BUTLER ETAL  3,125,209
STACKER CONVEYOR AND METHOD OF CONVEYING
Filed Aug. 11, 1961  4 Sheets-Sheet 3

INVENTORS
William S. Butler
Paul J. Fontaine
Roy F. Lo Presti
BY Parker & Carter
ATTORNEYS March 17, 1964  W. S. BUTLER ETAL  3,125,209
STACKER CONVEYOR AND METHOD OF CONVEYING
Filed Aug. 11, 1961  4 Sheets-Sheet 4

INVENTORS
William S. Butler
BY  Paul J. Fontaine
Roy F. LoPresti

Parker & Carter
ATTORNEYS

United States Patent Office 3,125,209
Patented Mar. 17, 1964

3,125,209
STACKER CONVEYOR AND METHOD OF CONVEYING
William S. Butler, Clarendon Hills, and Paul J. Fontaine and Roy F. Lo Presti, Chicago, Ill., assignors to Goodman Manufacturing Company, Chicago, Ill., a corporation of Illinois
Filed Aug. 11, 1961, Ser. No. 130,854
19 Claims. (Cl. 198—36)

This invention relates to a method and apparatus for stacking material in a pile, and more particularly, to a method and apparatus for building and enlarging a material storage pile with a conveyor that extends as the pile is built up.

In storing materials sucsh as sand and other particulate material, it has been the practice to use inclined, cantilevered rigid frame belt conveyors to transport material from a receiving point over a raised discharge end to form a storage pile. The volume of the pile that was built up depended on the length and angle of the conveyor system feeding such pile. The angle at which a conveyor belt will transport material up an incline is limited by the tendency of the material to roll back or slip on the belt.

Such conveyor systems are large, inflexible and present problems in transportation, storage, assembly and disassembly.

It is therefore a primary object of this invention to provide a portable, light weight, extensible stacker conveyor.

Another object of the invention is to provide a stacker conveyor adapted to be supported by the material it has conveyed and discharged.

Another object of the invention is to provide an extensible stacker conveyor adapted to climb the pile of material that has been discharged by said conveyor.

Another object is to provide a method and apparatus for stacking material in a pile with an apparatus assembled to a convenient size to meet the demands of a particular job.

Yet another object of the invention is to provide a stacker conveyor that discharges materials close to the crest of the pile to thereby minimize dust and reduce the presence of fines.

Yet another object of the invention is to provide an extensible conveyor system which is pulled along the surface path of the pile by adjustable means.

Still another object of the invention is to provide an extensible stacker conveyor system which is pulled along its work course by a tow line adjusted to be substantially parallel to the work surface.

Still another object of the invention is to provide a pivotal supporting member for a towing line which pulls an extensible stacker conveyor along the surface path of a pile created by the material stacked by said conveyor.

The foregoing objects and other objects are now realized by the present invention which will be described in detail and which is illustrated, in part schematically, in the attached drawings, wherein.

Like reference numerals will refer to like structures in the various figures of the drawings.

The stacker conveyor of this invention comprises a head unit which stores flexible conveyor belt that can be payed out as the conveyor system is extended along the surface of a built-up pile; it further comprises a head unit wherein mobile and motive means are provided for carrying the extensible conveyor belt along the surface of a stacked-up pile.

Figure 1:
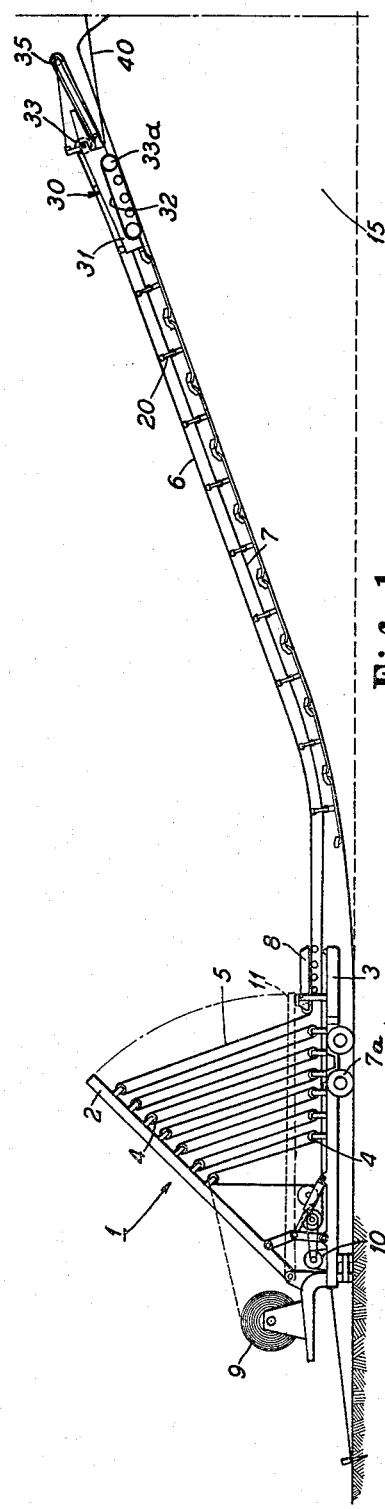
FIGURE 1 is a side view of a portion of the apparatus in operation.
Figure 2:
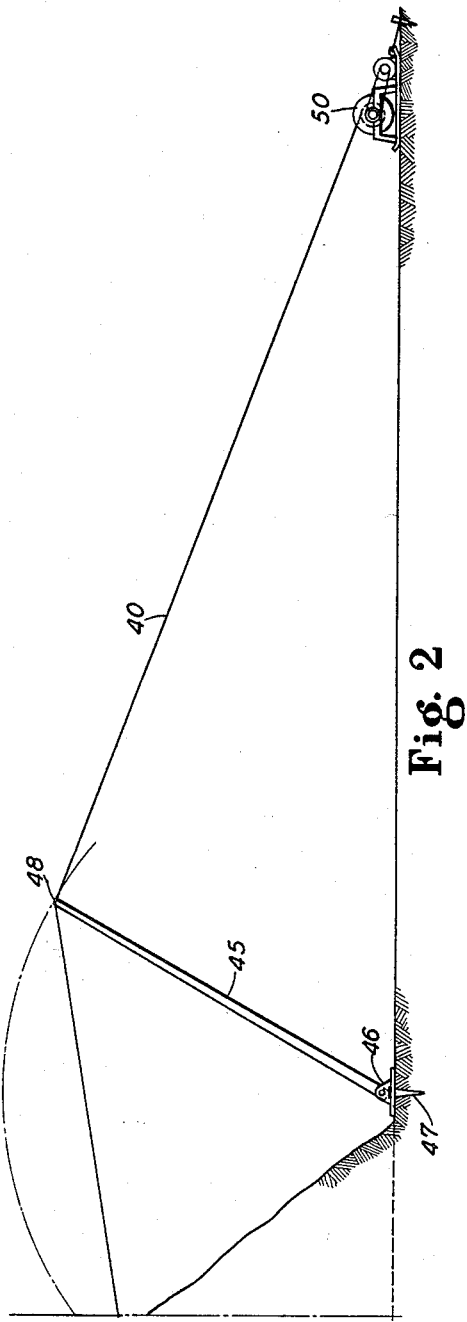
FIGURE 2 is the remaining portion of the apparatus shown in FIGURE 1.

Referring to FIGURE 1, the tail unit generally designated as 1 is shown as including a fixed platform 3 to which is pivoted a movable boom 2. A plurality of upper pulleys 4 are disposed along the movable boom 2 and a corresponding series of lower pulleys are on the platform 3. This movable boom stores a length of conveyor belt 5. The belt 5 is an endless belt in that the conveying reach 6 and the return reach 7 travel over idler roller assemblies in supporting stands generally shown at 20. The return reach 7 of the conveyor belt 5 is urged along a pulley assembly by a belt drive system generally shown as 10. This return reach 7, the stored belt held by the upper and lower pulleys 4, and the conveying reach 6 form an endless belt in the conveyor system. As the head unit 30 is pulled along the surface of the pile generally referred to as 15, the additional conveyor belt needed is provided by gradually lowering the movable boom 2 toward the rigid platform 3 until all of the conveyor belt 5 is payed out along the surface path of the pile 15. The movable boom 2 is in a fully lowered position as indicated by phantom outline 11 when all the conveyor belt 5 is payed out. A reel 9 may be used to reload the tail unit and the broken line in FIGURE 1 indicates this action.

The head unit 30 travels along the surface path of the pile 15 and is shown as consisting of a housing 31 for the front of the endless conveyor belt 5. The housing 31 can move along the surface path by means of opposite endless belts 32 and 32a rotating around idler pulleys 33a. The head unit 30 is pulled along its course by a tow line 40 which has one end secured to the housing unit 31 and the other end fixed to a pulling force which is illustrated herein as a winch or windlass 50.

The tow line is supported by a pivotal member or mast or gin pole 45. The gin pole 45 is secured to an anchor base 46 by swivel means, and the anchor base 46 is secured to the ground alongside the rising pile by removable anchoring stakes 47. The pivotal mast or gin pole 45 is positioned so that the angle of the tow line 40 is substantially parallel to the surface path of the pile 15. The tow line 40 is fixed to the top end of the gin pole 45.

The endless conveyor belt 5 is supported along its course by spaced supporting stands. Such supporting stands 20 are added at the foot of the rising pile as needed, and they are carried along with the conveyor belt as it is extended along the surface path of the material pile 15.

Figure 7:
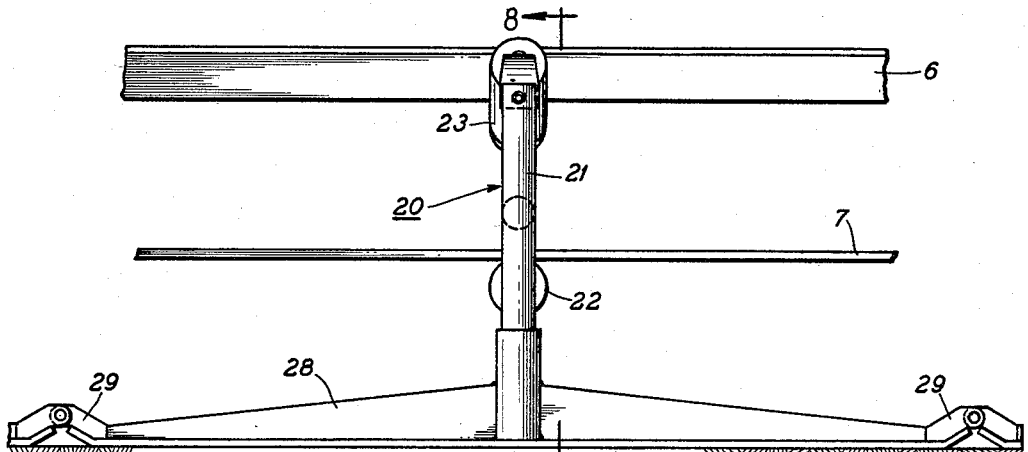
FIGURE 7 is a side view of a supporting stand and troughing idler for the conveyor belt.
Figure 8:
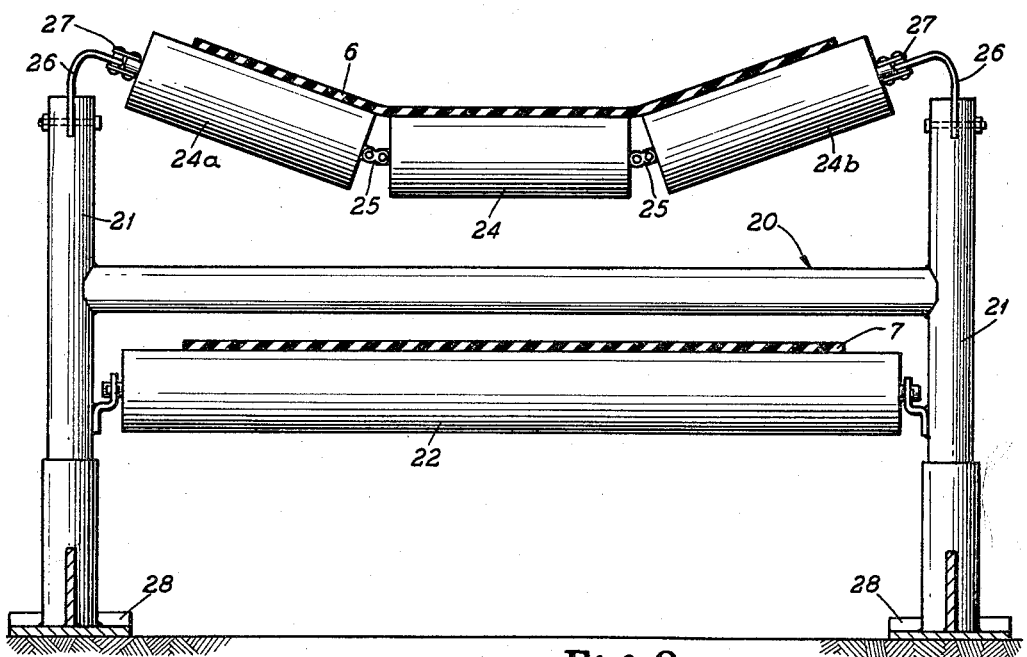
FIGURE 8 is a view along line 8—8 of FIGURE 7.
Figure 9:
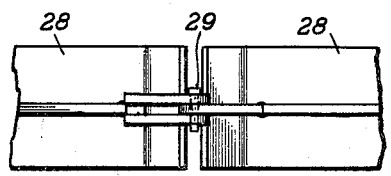
FIGURE 9 is a fragmentary top plan view of the skid runner connecting the spaced supporting stands.

Referring to FIGURE 7, the supporting stand 20 is shown as having an upright standard 21 to which is attached a return roller 22 to guide the return reach 7 of the conveyor belt 5. Also fixed to the upright standard is a troughing idler assembly 23 along which the conveying reach 6 of the conveyor belt 5 rides. One spaced supporting stand 20 is connected to another supporting stand by means of a skid runner 28 which is fixed to the base of the upright support 21. The skid runner 28 is preferably manufactured from material such as steel to allow the runner to move along the surface path of the material pile 15 in response to the pulling force of the tow line. The skid runners 28 are connected along their course by linking members 29 which allow vertical flexing but which prevent any lateral flexing.

The troughing idler assembly which guides the conveying reach 6 of the belt 5 is shown as including a center roller 24 and two wing rollers 24a and 24b. The rollers are linked one to the other by vertical flexing means 25 and the wing rollers 24a and 24b are connected to the upright standard 21 by a yieldable spring 26. The yieldable spring 26 is connected to the end roller by a swivel linkage 27 which permits horizontal movements of the wing rollers. Such an arrangement is disclosed in the copending application of Roy F. Lo Presti, Serial No. 27,117, filed May 5, 1960.

Figure 10:
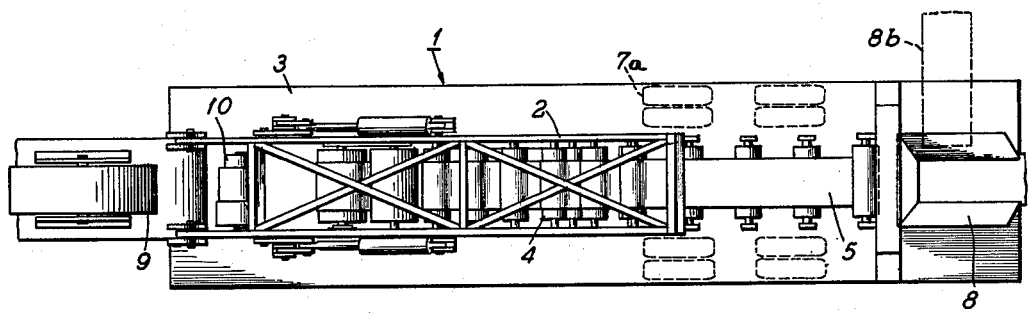
FIGURE 10 is a top plan view of the tail unit for the stacker conveyor.

The tail unit 1 is seen in FIGURE 10 to include the movable boom 2 with the upper storage pulleys 4 holding a supply of conveyor belt 5 in a folded relationship. The tail unit 1 can also be provided with a spare reel 9 of conveyor belt to replenish the payed out belt as indicated by the broken line in FIGURE 1. The wheels 7a of the tail unit are shown in phantom outline under the rigid platform 3. Also shown is a hopper 8 to receive the material from a feeder conveyor or supply conveyor 8b. The material to be stacked is fed into the hopper 8 and transported along the conveying reach 6 of the conveyor belt 5 to the point of furthest extension, as defined by the position of the head unit 30.

Figure 11:
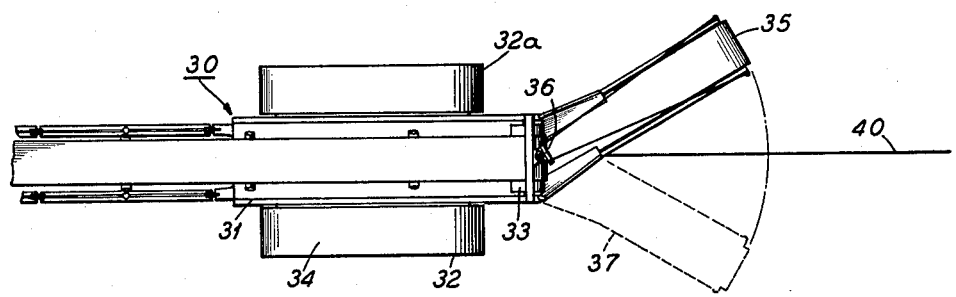
FIGURE 11 is a top plan view of the head unit with auxiliary conveyor extension of the stacker conveyor.

The head unit 30, as seen in FIGURE 11, includes a frame 31 which houses opposite traveling means 32 and 32a, and an end pulley 33 around which the front of the conveyor belt is wrapped. The traveling means 32 and 32a include an endless belt 34 moving around idler rollers 33a, as best seen in the general illustration of FIGURE 1. The head unit 30 is also shown as having a swinging auxiliary conveyor 35 which is joined to the frame 31 by swivel means 36. Suitable motive power is provided to create either an automatic or controlled side to side sweep of the auxiliary conveyor 35 along a generally horizontal plane. Such a swinging conveyor 35 allows the discharged material to be spread over a large area. The extreme positions which are illustrated are shown by the conveyor 35 and the phantom outline 37.

The tow line 40 is connected to the top end 48 of the gin pole 45. When the pivotal anchor 46 is fixed in any one position on the ground, the top end of the gin pole 45 moves through at least a limited arcuate path. A selected angle of the gin pole will accordingly control the angle of the tow line 40 relative to the ground on which the material pile 15 is built up. The tow line 40 is thereby supported at various heights which correspond to points on an arc which defines the movement of the top of the gin pole 45.

The gin pole 45 can be pivoted to a generally inward angle to provide an inclined path for the head unit 30 when the pile 15 is rising upwards. As the foot of the built-up pile approaches closer to the point where the mast 45 is anchored to the ground, the angle of the gin pole to the ground is correspondingly increased because of the pivotal motion caused by the pulling force of the tow line. The increased angle of the pole 45 to the ground and the consequent raised height of the two line maintain the angle of the line 40 substantially parallel to the surface path of the built-up pile 15.

Figure 3:
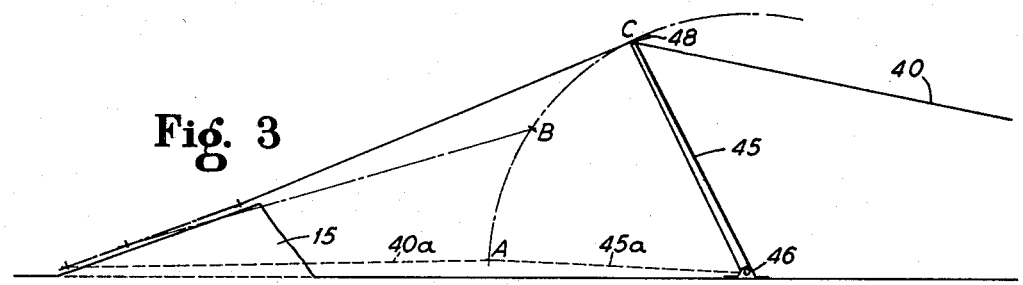
FIGURES 3–5 are representations of the tow line and supporting member in various positions.
Figure 4:
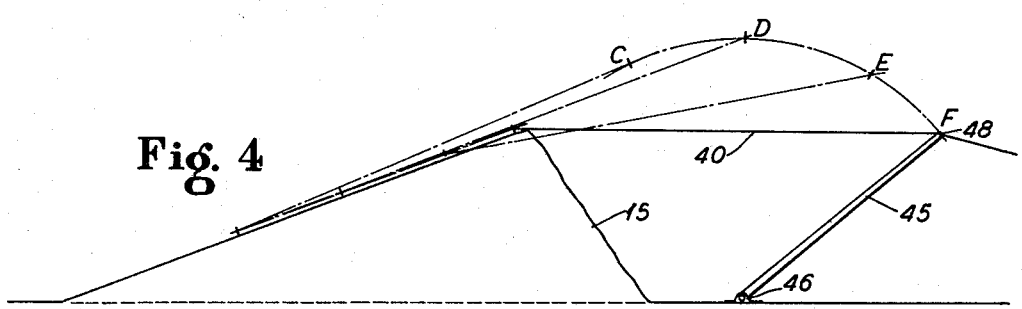

FIGURE 3 schematically depicts the swing of the pole 45 through its arc as the material pile 15 rises from the ground. Point A indicates the position of the top end of the pole. The corresponding positions of the tow line and the pole are indicated at 40a and 45a. At this point the pile is just building up. Points B and C indicate successive heights at which the pole 45 is raised as the pile 15 rises. FIGURE 4 indicates the extreme obtuse angle formed by the pole 45 for any one point of attachment to the ground. The successive heights are indicated by points C, D, E, and F.

Figure 5:
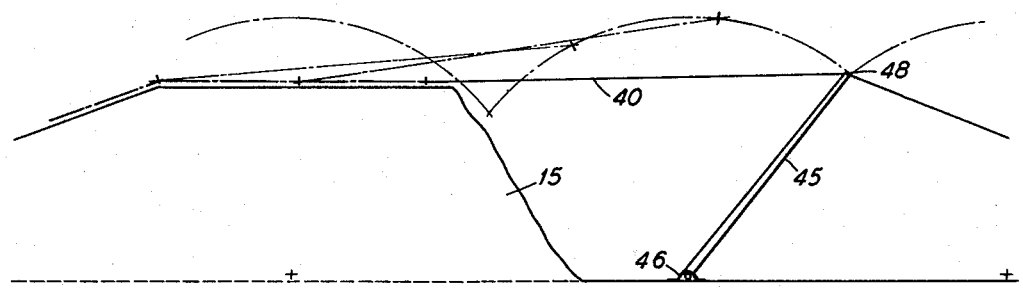
Figure 6:
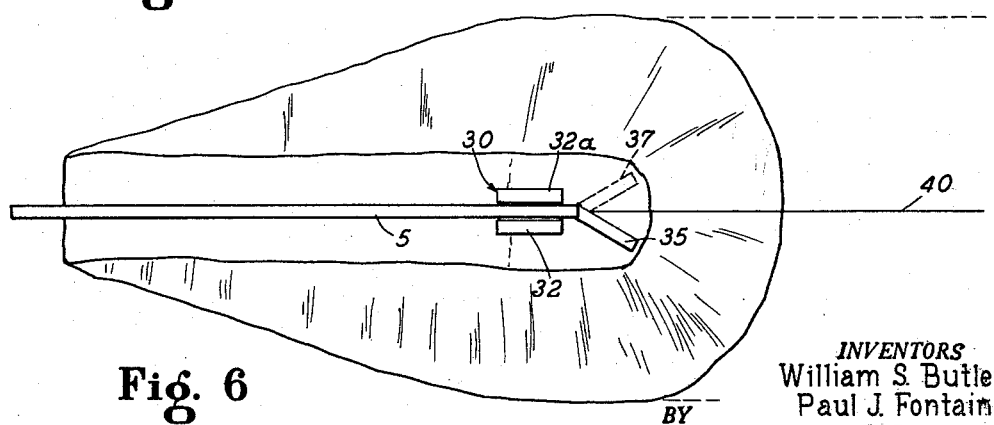
FIGURE 6 represents a fragmentary top plan view of the stacker conveyor building up the material pile.

When the angular position of the pole reaches point F, then the gin pole 45 is released from its secured position to the ground and moved forward and away from the advancing foot of the rising pile. The building up of the pile can then continue. When the crest of the rising pile reaches a height approximately equal to the height of the gin pole, the pile will flatten out, and the pole 45 can be pivoted so that the tow line 40 pulls the head unit 30 along a substantially horizontal plane, as shown in FIGURE 5. A relatively small arc will be formed by the top of the pole in such a case. The side to side swing of the auxiliary conveyor 35 can then be usefully employed to enlarge the area of the crest, as indicated in the top plan view of FIGURE 6. The size of the pile will be dependent on general factors, including the length of the gin pole, the length of the swinging conveyor 35, and the angle of repose of the material being stacked.

The use and operation of my invention is as follows:

A stacking operation is commenced by placing the tail unit at the loading station or in the approximate area where the material will be received for subsequent stacking. A length of conveyor belt 5 is stored on the tail unit. The amount of conveyor belt 5 so stored will depend on the particular purposes desired in a particular stacking operation. A stacking of a larger and longer pile will, of course, require a greater amount of stored conveyor belt. The advancing end of the extensible flexible conveyor belt 5 is supported by an advancing head unit 30. The front of the endless belt 5 is wrapped around the end pulley 33 housed in the supporting frame 31. An added swinging conveyor unit 35 may be placed at the front of this head unit to swing from side to side.

The operation is begun by securing one end of a tow line 40 to the advancing head unit 30. The other end of the tow line 40 is secured to a winch or a unit of equivalent pulling power 50 which is spaced at a distance from the head unit 30. The tow line is secured intermediate its ends to the top 48 of a gin pole 45 which is placed in a pivotal base 46; the base is then firmly secured to the ground by removable anchor stakes 47. Since no pile has arisen at the beginning of operations, the gin pole 45 is in a lowered position to form a very small acute angle with the ground. The tow line 40 rises with the top end of the gin pole 45 as the pole increases its angle with the ground.

The material at the loading station is now brought to the hopper 8 located on the tail unit 1, and such material passes from the hopper 8 into the conveyor belt 5 which has been placed in motion by belt driving means 10 located on the tail unit 1. The material is conveyed along a relatively short length of conveyor belt 5 and brought to that portion which is housed in the head unit 30, and thereafter transferred to the auxiliary conveyor belt 35 wherein it is discharged as the conveyor swings from side to side in a generally horizontal plane. The head unit advances and the pile rises as the tow line 40 is pulled by the winch 50. A length of conveyor belt 5 is payed out from the storage area and along the length newly covered by the advancing head unit 30.

Supporting stands 20 are joined to the conveyor at the foot of the rising pile to provide support. As the conveyor advances, the movable boom 2 is lowered to pay out belt from the storage area. The stacking of the material in a pile necessitates the gradual raising of the gin pole 45 from the ground which increases the acute angle formed by the pole and the ground and likewise increases the angle of the attached tow line to the ground.

The arc formed by the top of the pole 45 maintains the tow line 40 substantially parallel to the surface of the rising pile. The attachment of the pole to the pivotal base serves as the pivotal point from which the pole 45 swings in an arc that starts close to the ground and continues until the tow line 40 can no longer be maintained at the desired position to the surface path of the pile. When the time comes for moving the pivotal base 46, the anchoring stakes 47 are removed and the base 46 is moved along the ground in an advanced position from the foot of the rising pile 15. At this new position the pin pole 45 is again inclined towards the face of the rising pile 15 to selectively position the tow line 40 so that it is properly spaced at the desired angle from the surface path of the rising pile 15. The operation is again continued and the pole 45 is again swung through its arc to continue the proper angular spacing of the tow line 40 from the surface path of the rising pile 15.

When the rising pile 15 has reached a sufficient height, then a flat crest can be built on the pile 15 by the pivotal movement of the pole in a small arc. The side to side swinging of the auxiliary conveyor 35 also contributes to broadening the crest. When the foot of the raised pile 15 approaches the pivotal base 46 of the pole 45, then the pole 45 must be likewise disengaged from the anchoring base 46 by removing the anchoring stakes 47 and sliding the base 46 along the ground to an advanced position from the foot of the pile 15.

The foregoing invention can now be practiced by those skilled in the art. Such skilled persons will know that the invention is not necessarily restricted to the particular embodiments presented herein. The scope of the invention is to be defined by the terms of the following claims as given meaning by the preceding description.

We claim:

1. A method for stacking materials in a rising pile which includes the steps of receiving materials at a loading station, transferring the material to an endless conveyor, extending the endless conveyor, conveying the material on the endless conveyor to a discharge area, forming a rising pile of the discharged material, pulling a line connected to the endless conveyor at a point spaced from the conveyor, and adjusting the line intermediate the endless conveyor and the spaced point so that the line is substantially parallel to the rising surface of the pile.

2. The method of claim 1 further characterized by and including the step of placing supporting means in spaced positions along the extended conveyor.

3. The method of claim 1 further characterized in that the line is joined to a housing which comprises the front of the conveyor.

4. The method of claim 1 further characterized in that the line is adjusted to be maintained substantially parallel to the surface path of the rising pile by a pivotal member which moves through at least a limited arc whereby the pivotal member positions the line at various heights.

5. The method of claim 1 further characterized by and including the steps of transferring the material from the endless extensible conveyor to an auxiliary endless conveyor joined thereto by swivel means, swinging said auxiliary conveyor from side to side and discharging the material onto the pile.

6. The method of claim 1 further characterized by and including the steps of extending the endless conveyor along a path substantially parallel to the ground after the rising pile reaches a desired height, and maintaining the line substantially parallel to the surface of the pile as the conveyor extends along said path.

7. A method for stacking materials in a rising pile which includes the steps of storing a supply of flexible endless conveyor and providing driving means for said conveyor on a unit, placing the unit proximate to a loading station, loading material on the conveyor, pulling said conveyor by towing means secured at one end to a housing unit carrying the front portion of the conveyor, the other end of the towing means secured to a source of pulling power, discharging the material from the end of the conveyor, extending the conveyor along the surface path of a pile created by the discharged material, and adjusting the position of the towing means by a supporting member pivotally secured to the ground by removable means, whereby the towing means can be pivoted through a limited arc and the supporting member can be repositioned to maintain the towing means substantially parallel to the surface path of the pile created by the discharged material.

8. The method of claim 7 further characterized in that the supporting member is a pole, the bottom of the pole is pivotally fixed in a base by removable means, the top of the pole is connected to the towing means, and said top moves through at least a limited arc.

9. The method of claim 7 further characterized in that the supply of flexible conveyor stored by tension means is maintained under tension as the stored supply is payed out.

10. An apparatus for stacking materials in a pile which includes in combination a supply of flexible endless conveyor belt, a driving means for said endless conveyor belt, the front of the endless conveyor belt housed in a traveling unit, towing means fixed to a pulling source on one end and to the traveling unit on the other end, and supporting means intermediate said ends to adjust the towing means in various positions whereby the towing means selectively pulls the traveling unit along an angular surface path of the pile and along a substantially flat crest of the pile.

11. The apparatus of claim 10 further characterized in that the supply of conveyor belt is stored and maintained under tension, whereby it is payed out as needed.

12. The apparatus of claim 11 further characterized by and including a plurality of supporting stands spaced along the conveyor system.

13. The apparatus of claim 10 further characterized in that the towing means is a line connected to a supporting member pivotally secured to the ground on which the stacked pile arises.

14. The apparatus of claim 10 further characterized in that the conveyor belt is extended up the surface path of a stacked pile by a tow line secured to the traveling unit at one end and secured to a source of pulling power on the other end, said tow line connected at an intermediate position to the end of a supporting pole pivotally secured to the ground.

15. An apparatus for stacking materials in a pile which includes in combination a unit storing a supply of flexible conveyor belt under tension, driving means for said conveyor belt and means to place material on the conveyor belt, the front of the endless conveyor belt carried by a housing having means adapted to traverse a surface path of stacked materials, a towing line fixed at one end to the housing fitted with traveling means, the other end fixed to a source of pulling power and a supporting member intermediate the ends of the towing line and connected to the towing line at the top end of the supporting member, the bottom end of the supporting member pivotally joined to a base secured to the ground, said supporting member moving through at least a limited arc and adapted to be repositioned on the ground at a distance spaced from the advancing foot of the stacked pile.

16. An apparatus according to claim 15 further characterized by and including a plurality of supporting stands spaced along the conveyor system and resting on the surface path of the pile.

17. The apparatus of claim 15 further characterized in that the conveyor belt and the drive means for said conveyor belt are on a mobile unit.

18. The apparatus of claim 15 further characterized by and including an auxiliary endless conveyor joined by swivel means to the housing, said auxiliary endless conveyor belt adapted to swing from side to side in a generally horizontal plane whereby the material from the endless conveyor belt is transferred to the auxiliary conveyor and thereafter discharged from the auxiliary conveyor.

19. The apparatus of claim 15 further characterized in that the supporting member for the tow line is a pole, the bottom of the pole is pivotally joined to a base secured to the ground by removable means, the top end is connected to the tow line and said pole is adapted to move in at least a limited arc and is adapted to have its base repositioned at a spaced distance from the advancing foot of the stacked pile.

References Cited in the file of this patent

UNITED STATES PATENTS

| | | |
|---|---|---|
| 2,263,506 | Lane | Nov. 18, 1941 |
| 2,781,890 | Mercier | Feb. 19, 1957 |
| 2,992,723 | Poundstone | July 18, 1961 |